Dec. 6, 1949 W. J. ALEXANDER 2,490,189
COLLAPSIBLE HAND TRUCK
Filed Oct. 24, 1947 2 Sheets-Sheet 2
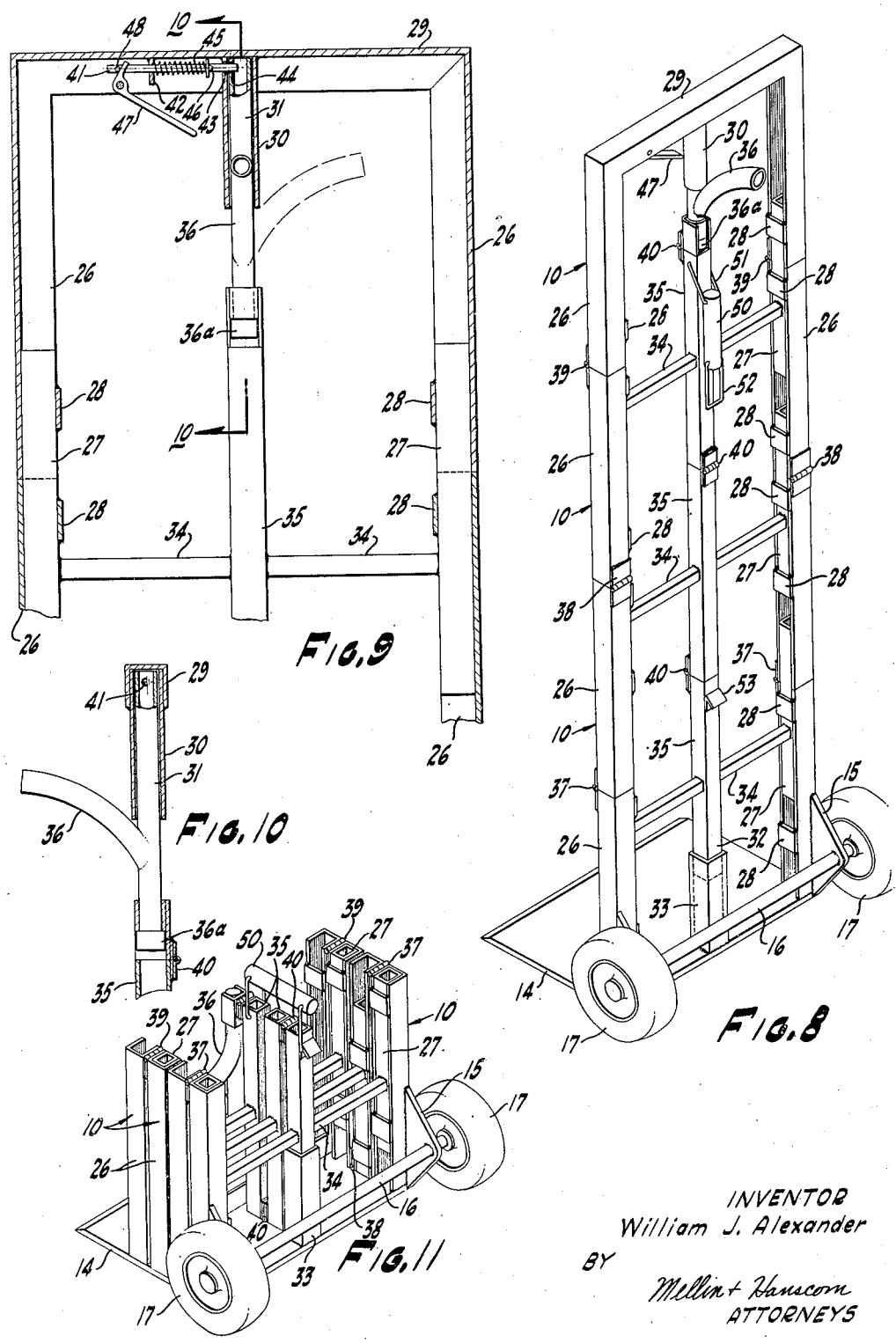
INVENTOR
William J. Alexander
BY
Mellin + Hanscom
ATTORNEYS Patented Dec. 6, 1949

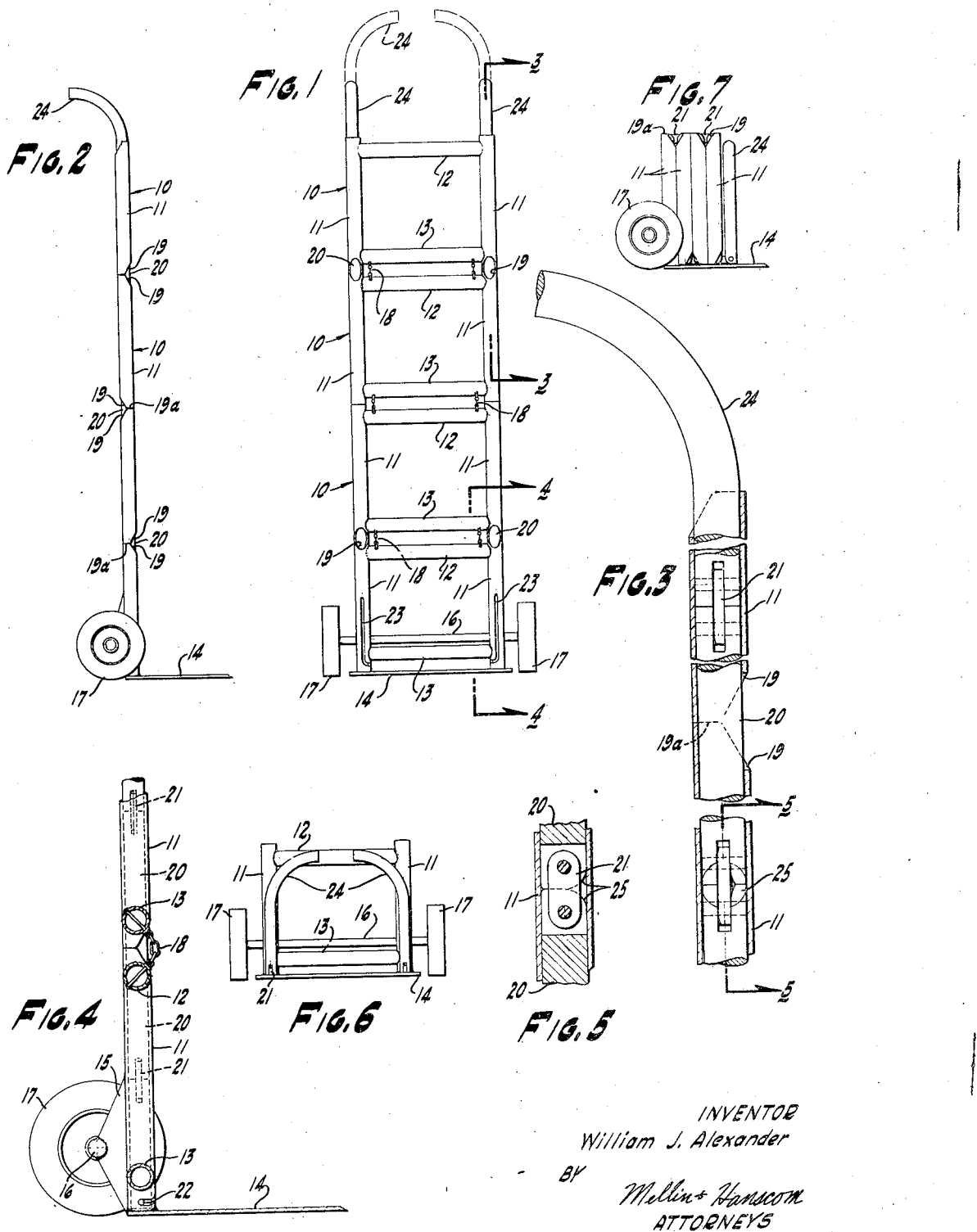

2,490,189

UNITED STATES PATENT OFFICE 2,490,189

COLLAPSIBLE HAND TRUCK

William J. Alexander, Oakland, Calif.

Application October 24, 1947, Serial No. 781,878

10 Claims. (Cl. 280—36)

The present invention pertains to hand trucks, and more particularly to hand trucks capable of being collapsed for storage in a comparatively small space when not in use.

An object of the invention is to provide an improved articulated hand truck whose parts can be rigidly correlated with respect to each other when the device is to be used, and which can be easily folded into a compact mass when not in use.

Another object of the invention is to provide improved lock or latch devices for maintaining the component parts of an articulated hand truck in rigid assembled relation when the truck is to be used.

Yet another object of the invention is to provide an articulated hand truck which can be collapsed into a compact easily portable mass.

A further object of the invention is to provide an articulated hand truck whose component parts are telescopically arranged to enable them to be positioned in rigid, mutually supportable relation to one another or to be positioned in such manner as to permit their folding adjacent one another into a compact mass.

Several forms which the invention may assume are exemplified in the following description and illustrated by way of example in the accompanying drawings in which:

Fig. 1 is a front elevation of one embodiment of the invention.

Fig. 2 is a side elevation of the collapsible hand truck disclosed in Fig. 1.

Fig. 3 is a longitudinal fragmentary section, on an enlarged scale, taken along the line 3—3 on Fig. 1.

Fig. 4 is a section on an enlarged scale taken along the line 4—4 on Fig. 1.

Fig. 5 is a fragmentary section taken along the line 5—5 on Fig. 3.

Fig. 6 is a front elevation of the hand truck in collapsed and folded condition.

Fig. 7 is a side elevation of the hand truck in collapsed and folded condition.

Fig. 8 is an isometric projection of a second form of collapsible hand truck embodying the invention, as seen primarily from the rear thereof.

Fig. 9 is a transverse section through the upper portion of the hand truck disclosed in Fig. 8.

Fig. 10 is a fragmentary section taken along the line 10—10 on Fig. 9.

Fig. 11 is an isometric projection of the hand truck disclosed in Fig. 8 in folded condition.

In the form of the invention disclosed in Figs. 1 to 7, inclusive, the hand truck is made of a plurality of articulated sections 10, each of which includes opposed side members 11 and upper and lower transverse members 12, 13 welded or otherwise secured to the side members. The sections are disposable lengthwise of one another to provide a frame on which a load can be supported, with the lowermost section 10 having a forwardly projecting apron 14 welded or otherwise secured thereto, and also a pair of axle brackets 15 welded or otherwise secured to the rear of the lower side members 11 for reception of an axle 16 on which wheels 17 are rotatably mounted in such manner that their peripheries are substantially tangent to a plane including the forwardly projecting apron.

The sections 10 are not secured to one another, but instead are articulately arranged, the degree of separation between them being limited by relatively short chains 18 securing adjacent sections together by being attached to the lower transverse member 13 of one section and to the upper transverse member or cross member 12 of the next adjacent section.

The ends 19 of the side members 11 of adjacent sections are beveled in opposite directions to form relief portions enabling the sections to be folded upon one another. The beveled portions 19 are alternately disposed at the front and rear of the hand truck frame in order that the sections 10 may be folded upon one another. For example, as seen in Figs. 1 and 2, the forward portions of the uppermost section and the adjacent intermediate section are beveled, the rear portions of the adjacent intermediate sections are beveled and the forward portions of the lower intermediate section and lowermost section are beveled, so as to permit them to fold upon one another. However, when they are extended their adjacent ends 19a abut one another and such ends 19a are substantially at right angles to the axis of the side members 11, in order to insure the rigid support of one member upon the other.

The side members 11 of each section 10 are generally tubular in shape to enable them to slidably receive bridging members 20, which are adapted to extend across adjacent side members or to be disposed within a side member of each section, as desired. Adjacent rigid members 20 are connected to one another through the medium of a link 21 pinned thereto, the bridging members 20 and intermediate link connections 21 extending completely through all of the side members 11. The lowermost bridging member on each side of the hand truck is provided with a pin 22 adapted to move within a J type of slot 23 formed in the side member 11 of the lowermost section. The slots 23 on each side of the hand truck are oppositely disposed and face toward one another, for a purpose to be described below.

The uppermost bridging member 20 projects from the uppermost sectional frame 10 and has a curved handle 24, which is adapted to be grasped by the operator in transporting articles on the hand truck, and also in effecting the locking of the sections 10 to one another.

The adjacent ends 25 of the bridging members are curved or beveled in the same directions as the adjoining bevels 19 on the tubular side members 11; that is, the bridging members 20 adjacent the forward beveled portions 19 have their ends 25 curved or beveled toward the front of the truck, while the adjacent ends 25 of the bridging member near the side members 11 beveled in a rearward direction are curved or beveled in a rearward direction.

The bridging members 20 are substantially equal in length to the length of the side members 11. Accordingly, when the entire articulated bridging structure 20 is shifted within the tubular side members, each bridging member 20 may be disposed across the joint 19, 19a between adjacent tubular side members 11 or may be disposed substantially entirely within a side member 11. When arranged in the first-mentioned fashion, the bridging member 20 serves to lock the side members 11 to one another to form a rigid truck frame structure; while, when disposed in the second-mentioned position, the sectional members 11, 20 may be folded upon one another.

When the handle members are disposed in their full line position, as seen in Figs. 1 and 2, facing to the rear, each pin 22 is disposed in the horizontal lower leg of the slot 23, wherein each bridging member 20 is located partly in one side member 11 and partly in the adjacent side member, in order to bridge the joints 19, 19a between the frame sections 10. The pins 22, accordingly, lock the telescopic bridging mechanism 20 in place and prevent collapse of the side members 11, holding the entire frame structure in rigid fashion, with the parts incapable of moving relatively to one another. The hand truck may then be manipulated in the same manner as if it were an integral structure, with a load placed upon or removed from the apron 14 and transported to and from various locations.

When it is desired to fold the hand truck, the load, of course, is first removed from the apron and the handles 24 swung inwardly about the axes of the side members 11 toward the dotted line positions disclosed in Fig. 1, which will place the lock pins 22 in the longitudinal legs of the slots 23 and allow the handle members to be elevated with respect to the side members. When the pins 22 are disposed in the uppermost portion of the slot 23, the bridging members 20 will have been completely removed from their bridging relation across the joints 19, 19a between adjacent side members 11 and will be located substantially entirely within the confines of the respective side members 11 of the sectional frame, whereupon the sections may be folded upon one another, in the manner illustrated in Figs. 6 and 7, resting upon the apron 14. To obtain such disposition of the parts, the joint between the lowermost and next adjacent sectional frame has its beveled portions 19 facing forwardly, the next joint facing rearwardly, and the uppermost joint facing forwardly. It is evident that the frame sections may be folded upon one another, as illustrated in Fig. 7, with the handle members 24 disposed inwardly and facing toward one another. When in the folded position, the links 21 merely extend substantially parallel to the apron 14, but do not interfere at all with the folding action.

The flexible tie members or chains 18 between adjacent cross members 12, 13 of adjacent sections 10 hold the parts generally in their relative location with respect to one another, allowing the sections to be folded upon one another, but at the same time permitting them to be distended and placed in longitudinal alignment prior to depression of the handles 24 and associated bridging members 20 to locate the latter across the side member joints 19, 19a, which will lock the side members 11 to one another.

In the form of invention disclosed in Figs. 8 to 11, inclusive, the apron 14 is secured to the side members 26 of the lowermost section, with the axle brackets 15 and wheels 17 disposed at the rear of such side members, in the same general fashion as described in connection with the other embodiment of the invention. In the form of invention disclosed in Figs. 8 through 11, however, transverse or cross members rigidly secured to the side members are not employed. Instead, the bridging mechanism for rigidly relating the side members 26 of the sections to one another also serves as cross braces.

The side members 26 of each section 10 are U-shaped in cross section with their open sides facing toward one another to provide channels in which the bridging members 27 are slidable. For the purpose of confining the bridging members within the channels, strips 28 may be welded across the open faces of the side members at suitable intervals.

The lowermost side members 26 are welded or otherwise secured to the apron 14, while the uppermost side members 26 are welded or otherwise suitably secured to a cross member 29, having a centrally disposed upper socket 30 adapted to receive the upper cylindrical portion 31 of the bridge operating device. The lower portion 32 of the bridge operating device may be of rectangular or square cross section, slidably fitting within a companion socket 33 parallel to the lowermost side members 26 and welded or otherwise suitably secured to the apron 14.

The bridging mechanism includes the side bridging members 27 slidable within the channel-shaped side members 26, each of such bridging members having a length substantially equal to the length of the associated side member. The bridging members 27 on each side are secured together for joint movement by means of a cross member 34 attached to the side bridging members and also to a central operating member 35 whose ends may be placed in transverse alignment with the ends of the side members 26. The handle portion 36 of the operating device, which also functions as a handle for the hand truck, has its lower end 36a swiveled within the upper end of the upper operating member 35.

The lowermost and lower intermediate side member sections 10 are secured to one another by means of hinges 37 attached to the forward portions. The intermediate two side members 26 are hinged to each other by means of hinges 38 secured to their rearward portions, while the upper intermediate and topmost side members 26 are suitably secured to one another by hinges 39 welded to their forward portions. Similarly, the operating member sections 35 are secured to one another by hinges 40 at their forward and rearward portions to conform to the hinge connections 37, 38, 39 of the side members 26 of the sectional frame.

The tubular handle member 36 may be secured in a locked position with respect to the frame by means of a latch in the form of a bolt 41 slidably mounted in a lug 42 depending from the upper cross member 29 and extending through a hole 43 in the upper socket 30 for reception within a corresponding hole 44 in the upper tubular handle element 31. A spring 45 bears against a flange 46 on the bolt 41 and against the lug 42, normally tending to urge the bolt to locked position within the hole 44 in the tubular handle element. An operating lever 47 is pivoted to the cross member 29 and has one arm adapted to bear against a pin 48 secured to the bolt 41 and its other arm depending from the cross member 29 in order that elevation of the operating lever arm will retract the bolt 41 against the action of the spring 45 and permit movement of the handle member 36.

In the operation of the device, release of the bolt 41 allows the handle member 36 to be lowered, which will place the side bridging members 27 out of their bridging position across the adjacent side members 26 of each section 10 and entirely within the confines of each side member. The hinged connections 40 between the intermediate operating members will also be placed in transverse alignment with the respective pivotal axes of the hinges 37, 38, 39 securing the side members 26 to one another. This position can be determined by engagement of the lowermost operating member 35 with the bottom of the socket 33. When in this position, the sections 10 and also the sections 35 of the operating mechanism may be folded upon one another in the manner illustrated in Fig. 11, with all the sections 10 being stacked adjacent one another and resting upon the forward apron 14.

For purposes of portability, a suitable handle 50 may be provided, the handle being secured at one end to the upper operating section 35 through a link 51, and also having another link 52 at its lower end adapted to engage a hook 53 secured to the upper portion of the lower operating member 35. By disposing the last-mentioned link 52 on the hook 53, in the manner disclosed in Fig. 11, the entire collapsed hand truck may be lifted by grasping the handle 50, and transported to any location or placed in storage.

When it is desired to unfold the hand truck and place all of the elements in rigid relation with respect to one another, the link 52 is removed from the hook 53 and the parts are distended, with the side members 26 of the sections 10 stacked on top of one another and in longitudinal alignment with each other, whereupon the handle 36 may be grasped and elevated to place its hole 44 in alignment with the bolt 41, which is then released and moved by the spring 45 into the tubular portion 31 of the handle member. When in this position, the bridging elements 27 are disposed across adjacent side members 26 of each section, locking them to one another and preventing their being folded about the axes of the hinges 37, 38, 39. The handle 36 may then be grasped in the usual manner and the hand truck used to convey materials in any known and desired manner.

It is to be noted that the swivel connection 36a between the lower portion of the handle 36 and the upper operating member 35 allows the handle 36 to be swung toward the plane of the top section 16, in order to prevent its outward projection beyond the apron 14 when the structure is folded and to render the entire structure more compact.

It is, accordingly, apparent that a hand truck arrangement has been provided of articulated construction which can be readily folded into a comparatively compact mass and easily stored away. When its use as a hand truck is desired, the parts are readily locked to one another through the simple manipulation of the bridging devices and held in such locked position in order to hold the sections of the articulated frame in alignment with one another.

While I have shown the preferred forms of my invention, it is to be understood that various changes may be made in their construction by those skilled in the art without departing from the spirit of the invention as defined in the appended claims.

Having thus described my invention, what I claim and desire to secure by Letters Patent is:

1. A hand truck, including frame sections joined together and adapted to be arranged in substantial alignment, bridging elements pivotally connected to one another and slidably mounted in said sections, said bridging elements being movable across the joints of adjacent sections to hold them in alignment, said bridging elements being slidable from such position to place their points of pivotal connection adjacent said joints to allow said sections and said bridging elements to be folded on one another.

2. A hand truck, including frame sections joined together and having side members adapted to be arranged in substantial alignment, bridging elements pivotally connected to one another and slidably mounted in said side members, said bridging elements being arranged for movement across the joints of adjacent side members to hold them in substantial rigid alignment, said bridging elements being slidable from such position across the joints to place their points of pivotal connection in transverse alignment with said joints to allow said sections and said bridging elements to be folded on one another.

3. A hand truck, including frame sections joined together and having side members adapted to be arranged in substantial alignment, bridging elements pivotally connected to one another and slidably mounted in said side members, said bridging elements being arranged for movement across the joints of adjacent side members to hold them in substantial rigid alignment, said bridging elements being slidable from such position across the joints to place their points of pivotal connection in transverse alignment with said joints to allow said sections and said bridging elements to be folded on one another, and means for releasably locking said bridging elements with respect to said frame sections with the former disposed across said joints.

4. A hand truck, including a plurality of frame sections joined together and having side members adapted to be arranged in substantial endwise alignment, the frame section adjacent the lowermost frame section being foldable forwardly of said truck to a position adjacent said lowermost section, successive frame sections being foldable alternately with respect to one another in aft and fore directions, bridging elements pivotally connected to one another and slidably mounted in said side members, said bridging elements being arranged for movement across the joints of adjacent side members to hold them in substantially rigid alignment, said bridging elements being slidable from such position across the joints to place their points of pivotal connection in transverse alignment with said joints to allow said bridging elements to be folded with said sections on one another.

5. A hand truck, including a plurality of frame sections joined together and having side members adapted to be arranged in substantial endwise alignment, the lowermost frame section having a forwardly extending apron secured thereto and ground engaging wheels rotatably supported on the rear of said lowermost section, the frame section adjacent the lowermost section being foldable forwardly of said truck with successive frame sections being foldable alternately with respect to one another in successive aft and fore directions to dispose all of said sections adjacent one another and over said apron, bridging elements pivotally connected to one another and slidably mounted in said side members, said bridging elements being arranged for movement across the joints of adjacent side members to hold them in substantially rigid alignment, said bridging elements being slidable from such positions across the joints to place their points of pivotal connection in transverse alignment with said joints to allow said bridging elements to be folded with said sections on one another.

6. A hand truck, including a plurality of frame sections joined together and having side members adapted to be arranged in substantial endwise alignment, the frame section adjacent the lowermost frame section being foldable forwardly of said truck with successive frame sections being foldable alternately with respect to one another in successive aft and fore directions, interconnected bridging elements slidably mounted in said side members and adapted to be folded with respect to one another, and one or more handles secured to said bridging elements for moving said elements across the joints of adjacent side members to hold them in substantially rigid alignment and also to move said elements from such position across the joints to allow said bridging elements to be folded with said sections on one another.

7. A hand truck, including a plurality of frame sections joined together and each having a pair of opposed side members adapted to be arranged in substantial endwise alignment with the side members of an adjacent section, interconnected bridging elements at each side of said truck telescopically mounted in each of said pair of aligned side members, and means secured to each of said interconnected bridging elements for positioning said elements across the joints of adjacent side members or for removing said elements from such position across the joints to allow said elements to be folded with said sections on one another.

8. A hand truck, including opposed side members hingedly secured to one another and positionable in substantial endwise alignment, bridging elements slidably mounted in said side members, and means for positioning said elements across the hinged joints of adjacent side members or for removing said elements from such position across the joints, comprising cross members secured to opposite bridging elements and a longitudinally extending articulated operating member attached to said cross members.

9. A hand truck, including a plurality of pairs of opposed side members, adjacent pairs being hingedly secured to one another in such fashion that successive pairs of side members are foldable alternately with respect to one another in successive fore and aft directions to dispose said pairs of side members adjacent one another, bridging elements slidably mounted in said side members, an articulated longitudinally extending operating member secured to said bridging elements and adapted to be positioned with its points of articulation in transverse alignment with the hinged connections between said pairs of side members, wherein said bridging elements are removed from positions across the hinged joints of adjacent side members, said operating member being movable to dispose said bridging elements across said hinged joints.

10. A hand truck as defined in claim 9, including means for locking said operating member with respect to said side members to hold said bridging elements across said hinged joints of said side members.

WILLIAM J. ALEXANDER.

REFERENCES CITED

The following references are of record in the file of this patent:

UNITED STATES PATENTS

| Number | Name | Date |
| --- | --- | --- |
| 319,416 | Jury | June 2, 1885 |
| 2,037,988 | Larsen | Apr. 21, 1936 |
| 2,439,992 | Simonian | Apr. 20, 1948 |
| 2,468,390 | Binz | Apr. 26, 1949 |